United States Patent
Riecke

(10) Patent No.: US 6,638,400 B2
(45) Date of Patent: Oct. 28, 2003

(54) ELECTROCHEMICAL OXYGEN CONCENTRATOR

(75) Inventor: Michael Riecke, Lübeck (DE)

(73) Assignee: Drägerwerk Aktiengesellschaft, Lübeck (DE)

(*) Notice: Subject to any disclaimer, the term of this patent is extended or adjusted under 35 U.S.C. 154(b) by 167 days.

(21) Appl. No.: 09/950,866

(22) Filed: Sep. 12, 2001

(65) Prior Publication Data
US 2002/0033333 A1 Mar. 21, 2002

(30) Foreign Application Priority Data
Sep. 15, 2000 (DE) .......................... 100 45 683

(51) Int. Cl.⁷ .............................. C25B 9/04; C04B 33/32; C03C 10/00
(52) U.S. Cl. ................ 204/258; 204/262; 204/265; 204/266
(58) Field of Search ................ 204/258, 262, 204/265, 266

(56) References Cited

U.S. PATENT DOCUMENTS

| 4,666,579 A | * 5/1987 | Beaver et al. ............... 204/253 |
| 5,868,918 A | 2/1999 | Adler et al. |
| 6,117,288 A | * 9/2000 | Adler et al. ................ 204/256 |

FOREIGN PATENT DOCUMENTS

DE  197 54 213 C1  2/1999

* cited by examiner

Primary Examiner—Arun S. Phasge
(74) Attorney, Agent, or Firm—McGlew and Tuttle, P.C.

(57) ABSTRACT

An electrochemical cell for separating oxygen from the ambient air can be manufactured in a simple manner and inexpensively and both the electrodes and the electrolyte can be manufactured as thin layers. The electrochemical cell has a metallic housing plate (7), a gas-permeable carrier plate (11) located on the housing plate (7), a system of layers on the carrier plate (11), including a first electrode (13), an electrolyte (15) and a second electrode (17) exposed to the ambient air, wherein the oxygen generated is drawn off via a discharge opening at the housing plate (7).

20 Claims, 2 Drawing Sheets

ELECTROCHEMICAL OXYGEN CONCENTRATOR

FIELD OF THE INVENTION

The present invention pertains to an electrochemical oxygen concentrator for separating oxygen from a gas mixture containing oxygen.

BACKGROUND OF THE INVENTION

A device with an oxygen concentrator for separating oxygen from ambient air has become known from DE 197 54 213 C1. The prior-art oxygen concentrator is based on the principle of ion transport in solids and has as its essential components a solid electrolyte with electrodes arranged thereon in opposite positions. The electrochemical cell thus formed is heated to a temperature between 700° C. and 1,000° C. and is connected to an ionization voltage source. The ionization voltage is on the order of magnitude of about 1 V.

If the gas mixture from which oxygen is to be separated is passed over the cathode, oxygen is ionized and is transported by the driving potential of the ionization voltage present on the electrochemical cell to the anode, where a deionization takes place and pure oxygen can be removed.

Zirconium dioxide, which is stabilized by doping in its cubic structure, is used as the electrolyte in the prior-art oxygen concentrator. The doping of zirconium dioxide, e.g., with calcium, yttrium or magnesium oxide generates oxygen ion vacancies, which are decisive for the oxygen ion conduction. The range of application of electrolytes based on zirconium dioxide in terms of the temperature is usually above 800° C.

High requirements are also imposed on the electrode material of the prior-art electrochemical cell. Besides good electric conductivity, the electrodes must have a high porosity in order to allow the reaction gas, air in this case, to reach the interface between the electrode and the electrolyte. So-called perovskite materials are used as the electrode materials; the principal structure of these materials is $A_xB_yO_3$ (A and B=trivalent cations), and they have a sufficient conductivity for an air electrode.

An electrochemical cell in which the electrodes are arranged in a sandwich-like pattern at the electrolyte and the system of layers consisting of electrolyte and electrodes is stabilized by housing plates has been known from U.S. Pat. No. 5,868,918. The electrolyte in this electrochemical cell must have a certain minimum thickness of about one mm in order to still be able to receive the electrode material. In addition, additional sealing materials are necessary in the edge area between the housing plates and the electrolyte.

SUMMARY AND OBJECTS OF THE INVENTION

The primary object of the present invention is to provide an electrochemical cell which can be manufactured in a simple manner and at low cost and in which both the electrodes and the electrolyte can be prepared as thin layers.

An electrochemical cell is provided for separating oxygen from a gas mixture which contains oxygen as one of its components. The cell has a metallic housing plate and a porous gas-permeable metallic carrier plate located on the housing plate. A system of layers is provided on the carrier plate comprising a first electrode, an electrolyte, and a second electrode exposed to the gas mixture. At least one discharge opening is provided at the housing plate for drawing off the oxygen generated.

The advantage of the present invention is essentially that the system of layers consisting of electrodes and electrolyte is stabilized by a carrier plate permeable to oxygen, so that both the electrolyte and the electrodes can be prepared as thin, non-self-supporting layers. On the one hand, this leads to a low consumption of the very expensive electrode and electrolyte materials, and, on the other hand, the carrier plate, which is used for mechanical stabilization only, can be made of an inexpensive material. The carrier plate must be such that it is permeable to oxygen molecules. Suitable materials for the carrier plate are, e.g., metallic sintered materials.

Since both the electrodes and the electrolyte are not subject to great mechanical stresses by the subjacent carrier plate, brittle and fragile substances may be used for them, which have hitherto only been used with a greater material thickness. Due to the application of the electrodes and of the electrolyte layer by layer and the use of these substances, the working temperature of the electrochemical cell can be lowered to a value below 500° C., which has a favorable effect on the energy consumption.

The housing plate may advantageously be provided with bead-like depressions. As a result, channels are formed between individual electrochemical cells stacked on each other, through which the gas mixture, from which oxygen is to be separated, is to flow. In addition, the bead-like depressions cause the housing plate to be stabilized against bending and torsional stresses.

The housing plate of the electrochemical cell may advantageously be designed such that it has a side wall surrounding the carrier plate in a pot-shaped manner and a collar which projects from the side wall and extends in parallel to the top side of the carrier plate. The height of the side wall is selected to be such that the top side of the carrier plate and the collar extend flush with one another. To connect the carrier plate to the housing plate in a conductive manner, the two parts are welded together or pressed to one another in the area of the side walls and the bead-like depressions. The first electrode, the electrolyte and the second electrode are then arranged in a layer structure on both the collar and the top side of the carrier plate. The topmost second electrode is exposed as a cathode to the gas mixture.

Sealing of the carrier plate against the environment can be advantageously achieved by means of a gas-tight wall section extending along the lateral surface of the carrier plate. This wall section can be prepared, e.g., by pressing together the carrier plate along the side walls. The pores of the carrier plate are sealed by the pressing together. An alternative possibility is to apply a gas-tight coating along the side walls. The sealing by means of a gas-tight wall section is suitable for housing plates which have no pot-shaped raised side walls.

The layer thickness of the first electrode, i.e., the anode, is preferably in the range of 50 μm. The thickness of the electrolyte is preferably in the range of 10 μm to 20 μm. The second electrode, i.e., the cathode, has a preferred layer thickness of about 250 μm. The greater layer thickness for the second electrode arises from the circumstance that a larger electrode surface is needed for the ionization of the oxygen than for the deionization at the first electrode. In addition, a uniform current distribution must be present within the second electrode, because the second electrode is contacted in a punctiform manner only by the superjacent housing plate of an adjacent electrochemical cell.

The electrolyte is preferably formed as an electrolyte overlapping the first electrode in the area of the collar. As a result, improved sealing is achieved in the area of the collar, because the oxygen is no longer able to escape laterally through the porous first electrode.

The electrolyte preferably consists of gadolinium-doped cerium oxide, $Ce_{0.8}Gb_{0.2}O_{1.9}$ (CGO).

The electrode material is La perovskite, $La_{0.6}Sr_{0.4}Co_{0.2}Fe_{0.8}O_{3-x}$ (LSCF).

Both the housing plate and the carrier plate are made of comparatively inexpensive materials, such as high-chromium steels with a chromium content greater than 20%. The housing plate preferably consists of a high-chrome, ferritic steel, and the carrier plate is preferably sintered together from high-chromium steel particles.

To generate an oxygen flow sufficient for practical applications, electrochemical cells are stacked on one another in the form of a layer structure. The contacting between adjacent cells is always between the underside of the housing plate of one cell and the second electrode of an adjacent cell. The ionization voltage source is connected to the series connection of the individual cells in the known manner. About 3 L of oxygen can be generated per minute with a layer structure consisting of 15 electrochemical cells and a gas exchange area of about 100 cm² per cell.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
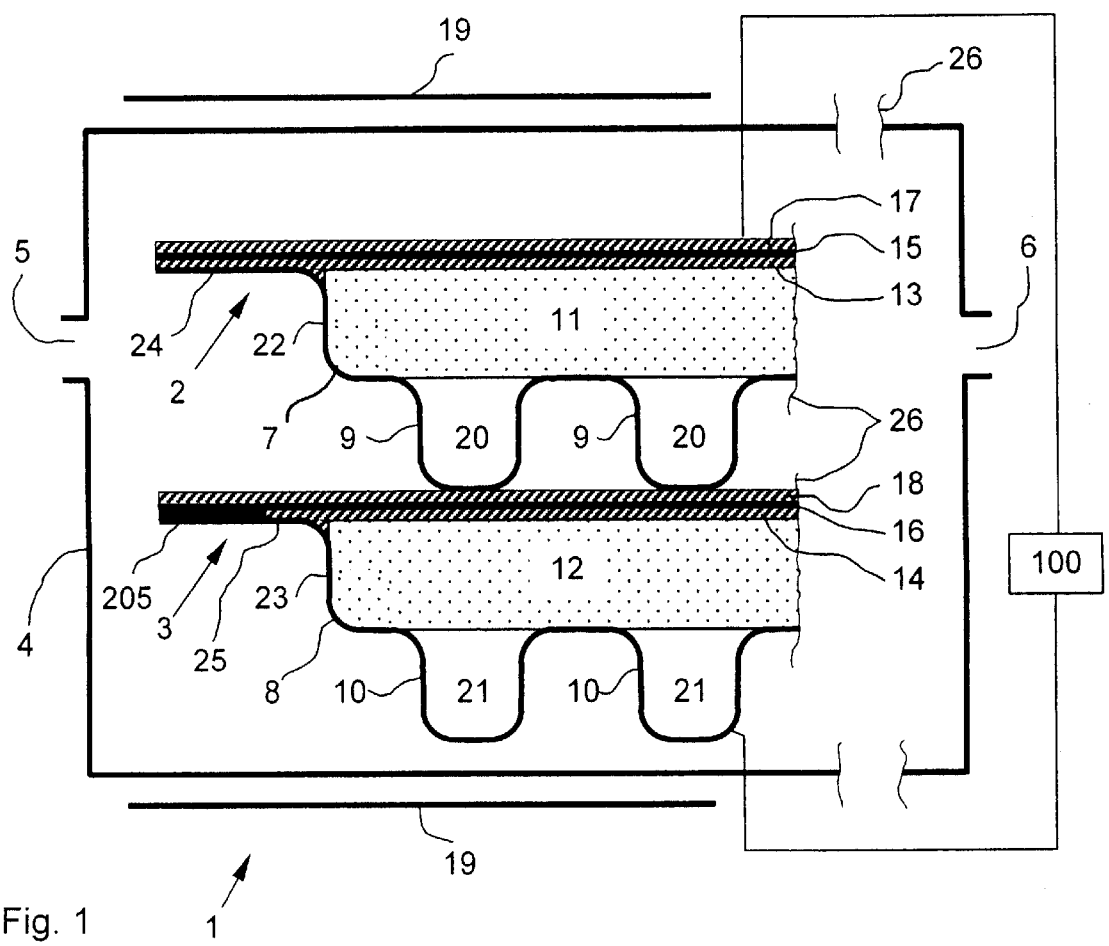
FIG. 1 is a schematic longitudinal sectional view of an oxygen concentrator according to the invention.

Referring to the drawings in particular, FIG. 1 schematically shows a longitudinal section of an oxygen concentrator 1 with a system of layers comprising a first electrochemical cell 2 and a second electrochemical cell 3 in a housing 4 with a gas inlet 5 and a gas outlet 6 for ambient air. The electrochemical cells 2, 3 are of identical design and comprise each a housing plate 7, 8 made of stainless steel, which is provided with beads 9, 10, a porous carrier plate 11, 12 from high-chromium sintered steel, which is permeable to oxygen molecules, a first electrode 13, 14 as an anode, an electrolyte 15, 16, and a second electrode 17, 18 as a cathode. A cell heater 19 is located at the housing 4. The cell heater 19 brings the electrochemical cells 2, 3 to an operating temperature of about 500° C. and also maintains this operating temperature. The electrochemical cells 2, 3 are connected to an ionization voltage source 100 in the known manner. The oxygen generated accumulates in the carrier plate 11, 12 and in gas channels 20, 21, which are formed by beads 9, 10 in the carrier plate 11, 12, and is then sent through a discharge opening, not shown specifically in FIG. 1, to a user, likewise not shown in the figure. The gas inlet 5 and the gas outlet 6 are arranged such that they extend flush with the beads 9, 10, so that the ambient air flows through the channels located between the beads. By contrast, the gas inlet 5 and the gas outlet 6 were rotated by 90° into the plane of the drawing for the sake of greater clarity.

The housing plates 7, 8 have side walls 22, 23, which are bent in a pot-shaped manner and surround the porous carrier 11, 12, and a circular collar 24, 25, which extends in parallel to the layer structure formed by the electrodes 13, 14, 17, 18 and the electrolyte 15, 16. The first electrode 13, 14 is connected to the housing plates 7, 8 in the area of the collar 24, 25.

In the first electrochemical cell 2, the electrodes 13, 17 and the electrolyte 15 are located one on top of another in a layer-like manner in the area of the collar 24. The second electrochemical cell 2 shows an alternative embodiment in the area of the edge sealing, in which the first electrode 14 is overlapped by the electrolyte 16 in an edge area 205. The improved sealing is achieved due to the fact that the oxygen molecules located in the carrier plate 12 can no longer escape through the likewise porous first electrode 14.

The electrodes 13, 14, 17, 18 consist of La perovskite, $La_{0.6}Sr_{0.4}Co_{0.2}Fe_{0.8}O_{3-x}$ (LSCF) and the electrolyte 15, 16 of gadolinium-doped cerium oxide, $Ce_{0.8}Gd_{0.2}O_{1.9}$ (CGO). The layer thickness of the first electrode 13, 14 is 50 $\mu$m, the layer thickness of the electrolyte 15, 16 is in the range of 10 $\mu$m and 20 $\mu$m, and the second electrode 17, 18 has a thickness of 250 $\mu$m.

Figure 2:
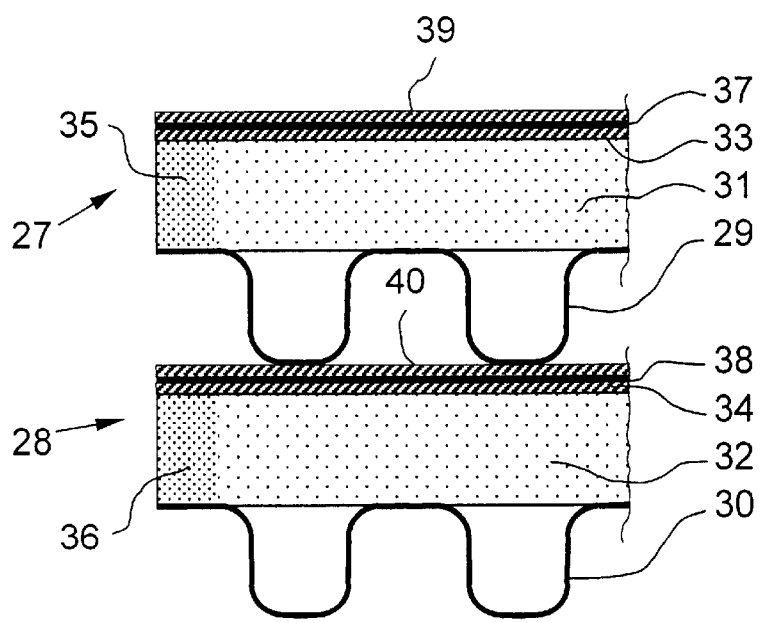
FIG. 2 is a schematic sectional view showing a system of layers comprising two electrochemical cells with an alternative edge sealing.

FIG. 2 shows an alternative embodiment of two electrochemical cells 27, 28 with housing plates 29, 30, porous carrier plates 31, 32 and first electrodes 33, 34, in which the sealing of the carrier plates 31, 32 against the environment is established by a gas-tight wall section 35, 36. The wall section (35, 36) is prepared by pressing the carrier plate 31, 32 along the side wall. The second electrodes 39, 40 are located above the electrolyte 37, 38.

Figure 3:
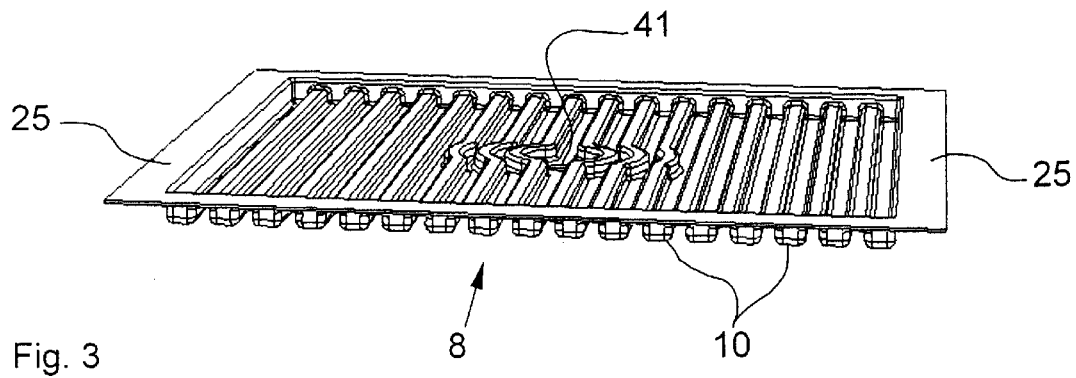
FIG. 3 is a perspective top view of a housing plate.

FIG. 3 shows a perspective top view of the housing plate 8 of the second electrochemical cell 3. Identical components are designated by the same reference numbers as in FIG. 1. A discharge opening 41 for the oxygen generated is located in the middle of the housing plate 8.

Figure 4:
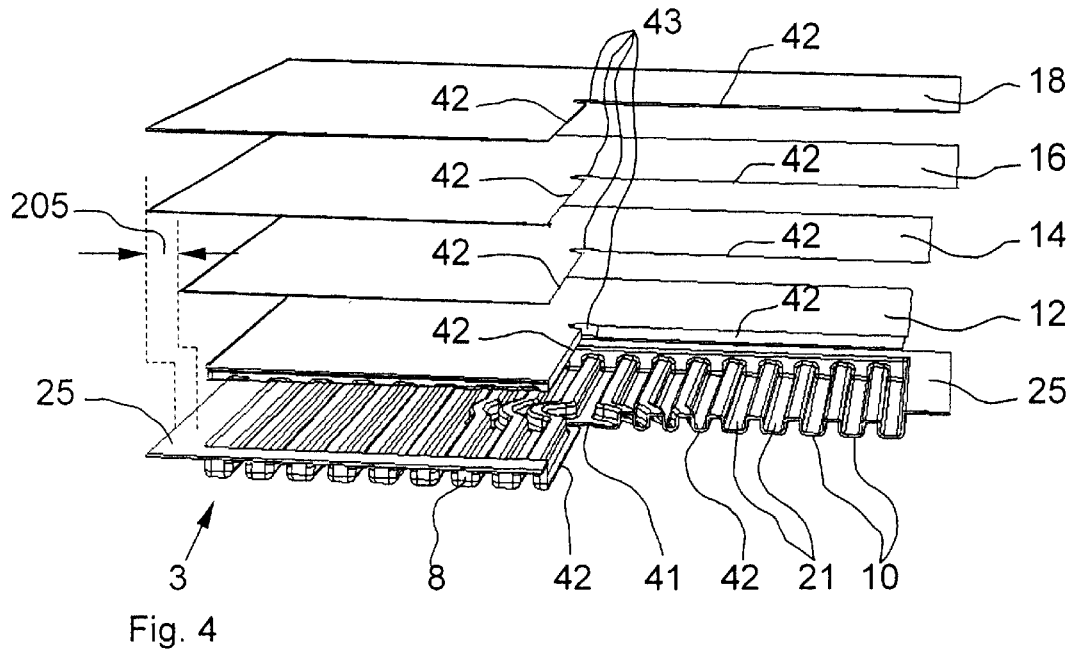
FIG. 4 is a perspective top view of an electrochemical cell which is cut up along a break line.

FIG. 4 shows a perspective view of the design of the second electrochemical cell 3. The housing plate 8, the carrier plate 12, the electrodes 14, 18, and the electrolyte 16 are cut up along a break line 42 for the sake of greater clarity, because, in addition to the housing plate 8, the carrier plate 12, the electrodes 14, 18, and the electrolyte 16 also have a discharge opening 43 for oxygen, which extends flush with the discharge opening 41. If a plurality of electrochemical cells 2, 3 are stacked up on one another, as is shown in FIG. 1, the discharge openings 41, 43 extending flush with one another form a gas-carrying connection between the discharge openings of adjacent electrochemical cells, so that the oxygen generated can be removed from the middle of the cells.

While specific embodiments of the invention have been shown and described in detail to illustrate the application of the principles of the invention, it will be understood that the invention may be embodied otherwise without departing from such principles.

What is claimed is:

1. An electrochemical cell for separating oxygen from a gas mixture which gas mixture contains oxygen as one of its components, the electrochemical cell comprising:

a metallic housing plate;

a porous gas-permeable metallic carrier plate located on said housing plate;

a system of layers on said carrier plate, said system of layers comprising a first electrode layer, an electrolyte layer and a second electrode layer exposed to the gas mixture; and at least one discharge opening at said housing plate for drawing off the oxygen generated.

2. An electrochemical cell in accordance with claim 1, wherein said housing plate has a plurality of bead-like depressions.

3. An electrochemical cell in accordance with claim 1, wherein said housing plate has a side wall surrounding said carrier plate in a pot-shaped manner and a collar, which projects from said side wall, extending in parallel to the system of layers and connected to said first electrode in an electrically conductive manner.

4. An electrochemical cell in accordance with claim 3, wherein said electrolyte is formed as an electrolyte overlapping said first electrode in the area of said collar.

5. An electrochemical cell in accordance with claim 1, wherein said carrier plate has a gas-tight wall section extending along a lateral surface of said carrier plate.

6. An electrochemical cell in accordance with claim 5, wherein said wall section is prepared by pressing together said carrier plate in an area of the lateral surface.

7. An electrochemical cell in accordance with claim 5, wherein the wall section is a coating consisting of a gas-tight material.

8. An electrochemical cell in accordance with claim 1, wherein said electrodes and said electrolyte are applied as thin layers to said carrier plate.

9. An electrochemical cell in accordance with claim 8, wherein the layer thickness of said first electrode is in the range of about 50 $\mu$m.

10. An electrochemical cell in accordance with claim 8, wherein the layer thickness of said electrolyte is between 10 $\mu$m and 20 $\mu$m.

11. An electrochemical cell in accordance with claim 8, wherein the preferred layer thickness of the second electrode is in the range of about 250 $\mu$m.

12. An electrochemical cell in accordance with claim 1, wherein said electrolyte consists of gadolinium-doped cerium oxide $Ce_{0.8}Gd_{0.2}O_{1.9}$ (CGO).

13. An electrochemical cell in accordance with claim 1, wherein said electrodes consist of La perovskite, $La_{0.6}Sr_{0.4}Co_{0.2}Fe_{0.8}O_{3-x}$ (LSCF).

14. An electrochemical cell in accordance with claim 1, wherein said housing plate consists of a high-chromium, ferritic steel.

15. An electrochemical cell in accordance with claim 1, wherein said carrier plate consists of high-chromium sintered steel particles.

16. An electrochemical cell comprising:

a porous gas-permeable metallic carrier plate;

a first electrode layer on said carrier plate;

an electrolyte layer on said first electrode layer;

a second electrode layer on said electrolyte layer; and a housing plate connected to said carrier plate at one side of said carrier plate, said housing plate having a discharge opening for drawing off generated oxygen.

17. An electrochemical cell in accordance with claim 16, wherein said housing plate has a plurality of bead-like depressions.

18. An electrochemical cell in accordance with claim 16, wherein said housing plate is made of a conductive metal and has a side wall surrounding said carrier plate in a pot-shaped manner and a collar, which projects from said side wall, extending in parallel to the layers and connected to said first electrode in an electrically conductive manner.

19. An electrochemical cell in accordance with claim 16, wherein said carrier plate has a gas-tight wall section extending along a lateral surface of said carrier plate.

20. An electrochemical cell for separating oxygen from a gas mixture which gas mixture contains oxygen as one of its components, the electrochemical cell being formed by the steps of:

providing a metallic housing plate;

positioning a porous gas-permeable metallic carrier plate on the housing plate;

providing a plurality of layers on said carrier plate comprising a first electrode layer, an electrolyte layer and a second electrode layer exposed to the gas mixture; and providing a discharge opening at said housing plate for drawing off the oxygen generated.

* * * * *